(12) United States Patent
Ranganath et al.

(10) Patent No.: US 11,255,205 B2
(45) Date of Patent: Feb. 22, 2022

(54) SYSTEMS AND METHODS FOR IMPROVING START UP WEAR PERFORMANCE OF CARBON SEALS

(71) Applicant: UNITED TECHNOLOGIES CORPORATION, Farmington, CT (US)

(72) Inventors: Santosh Ranganath, Glastonbury, CT (US); Andrew C Kilguss, Tolland, CT (US); William P Ogden, Hanover, PA (US); James P. Hammond, Southington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 146 days.

(21) Appl. No.: 16/293,383

(22) Filed: Mar. 5, 2019

(65) Prior Publication Data

US 2020/0284155 A1 Sep. 10, 2020

(51) Int. Cl.
*F01D 11/00* (2006.01)
*F16J 15/00* (2006.01)
*F16J 15/34* (2006.01)

(52) U.S. Cl.
CPC .......... *F01D 11/003* (2013.01); *F01D 11/005* (2013.01); *F16J 15/002* (2013.01); *F16J 15/34* (2013.01); *F05D 2220/32* (2013.01); *F05D 2240/55* (2013.01)

(58) Field of Classification Search
None
See application file for complete search history.

(56) References Cited

U.S. PATENT DOCUMENTS

| 5,501,470 | A | 3/1996 | Fuse et al. |
| 7,194,803 | B2 | 3/2007 | Young et al. |
| 8,167,545 | B2 | 5/2012 | Glahn et al. |
| 9,383,017 | B2 * | 7/2016 | Young ................ F16J 15/3408 |
| 9,964,216 | B2 * | 5/2018 | Inoue ................ F16J 15/3424 |
| 2006/0033286 | A1 | 2/2006 | Erich |
| 2014/0294331 | A1 | 10/2014 | Tokunaga |
| 2016/0333711 | A1 * | 11/2016 | Miller ................ F04D 29/122 |

FOREIGN PATENT DOCUMENTS

EP 3438417 2/2019

OTHER PUBLICATIONS

Surface Roughness Conversion Chart Tables—Engineers Edge—accessed online on Sep. 23, 2020 (Year: 2020).*
European Patent Office, European Office Action dated Aug. 27, 2020 in Application No. 20160762.9.
European Patent Office, European Search Report dated Dec. 14, 2020 in Application No. 20160762.9.

* cited by examiner

Primary Examiner — Juan G Flores
(74) Attorney, Agent, or Firm — Snell & Wilmer L.L.P.

(57) ABSTRACT

An improved face seal may comprise a seal housing having an annular extrusion, and a primary seal coupled to the seal housing. The primary seal comprises a sealing face and a base opposite the sealing face, wherein the primary seal has an annular structure coaxial with the annular extrusion with the base proximate a first end of the seal housing. The sealing face comprises a disrupted surface.

10 Claims, 8 Drawing Sheets

SYSTEMS AND METHODS FOR IMPROVING START UP WEAR PERFORMANCE OF CARBON SEALS

FIELD

The present disclosure relates to face seals arrangements, more specifically, to improving wear performance of dry face carbon seals.

BACKGROUND

Carbon face seals may typically be arranged about gas turbine engine shafts and tend to protect gas turbine engine hardware from hot gases in the turbine engine gas path. A portion of newly installed carbon face seals tend to exhibit premature sealing face wear during start up attributable to increased friction loading at the sealing face during the startup condition. In this regard, the carbon face seal may tend to have decreased sealing performance and may tend to result in damage to the gas turbine engine or gas turbine engine hardware surrounding the seal.

SUMMARY

In various embodiments, an improved face seal is provided comprising a seal housing comprising an annular extrusion, and a primary seal coupled to the seal housing, wherein the primary seal comprises a sealing face and a base opposite the sealing face, wherein the primary seal has an annular structure coaxial with the annular extrusion with the base proximate a first end of the seal housing, wherein the sealing face comprises a disrupted surface.

In various embodiments, the improved face seal further comprises a seal support, wherein the annular extrusion is disposed within the seal support, wherein the annular extrusion comprises a secondary seal at a distal end of the annular extrusion opposite the primary seal. In various embodiments, the disrupted surface comprises a patterned portion. In various embodiments, the patterned portion comprises one of a circumferentially patterned portion, a hatch pattern portion, or a cross-hatch pattern portion. In various embodiments, the patterned portion comprises a plurality of ablated portions having a depth below the sealing face between 0.381 μm to 12.7 μm. In various embodiments, the patterned portion comprises a plurality of ablated portions having a spacing between each of a relatively adjacent ablated portion of the ablated portions between 0.08 mm and 0.25 mm. In various embodiments, the patterned portion comprises a plurality of ablated portions having an Ra between 0.381 μm to 2.667 μm. In various embodiments, the patterned portion comprises a plurality of ablated portions having an Rz between 2.413 μm to 11.43 μm.

In various embodiments, a gas turbine engine is provided comprising a compressor section configured to compress a gas, a combustor section aft of the compressor section configured to combust the gas, a turbine section aft of the combustor section configured to extract work from the gas, and an improved face seal, comprising a seal housing comprising an annular extrusion, and a primary seal coupled to the seal housing, wherein the primary seal comprises a sealing face and a base opposite the sealing face, wherein the primary seal has an annular structure coaxial with the annular extrusion with the base proximate a first end of the seal housing, wherein the sealing face comprises a disrupted surface.

In various embodiments, the improved face seal further comprises a seal support, wherein the annular extrusion is disposed within the seal support, wherein the annular extrusion comprises a secondary seal at a distal end of the annular extrusion opposite the primary seal. In various embodiments, the disrupted surface comprises a patterned portion. In various embodiments, the patterned portion comprises one of a circumferentially patterned portion, a hatch pattern portion, or a cross-hatch pattern portion. In various embodiments, the patterned portion comprises a plurality of ablated portions having a depth below the sealing face between 0.381 μm to 12.7 μm. In various embodiments, the patterned portion comprises a plurality of ablated portions having a spacing between each of a relatively adjacent ablated portion of the ablated portions between 0.08 mm and 0.25 mm. In various embodiments, the patterned portion comprises a plurality of ablated portions having an Ra between 0.381 μm to 2.667 μm. In various embodiments, the patterned portion comprises a plurality of ablated portions having an Rz between 2.413 μm to 11.43 μm.

In various embodiments an article of manufacture is provided. The article of manufacture includes a carbon face seal having a disrupted surface thereon, the disrupted surface comprising a patterned portion defined by a plurality of ablated portions on a sealing face of the carbon face seal wherein the ablated portions have a depth below the sealing face between 0.381 μm to 12.7 μm.

In various embodiments, the plurality of ablated portions have a spacing between each of a relatively adjacent ablated portion of the ablated portions between 0.08 mm and 0.25 mm. In various embodiments, the plurality of ablated portions have an Ra between 0.381 μm to 2.667 μm. In various embodiments, the plurality of ablated portions have an Rz between 2.413 μm to 11.43 μm.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural. As used herein, all numerical values, measurements, ratios, etc. and/or the like may be read is if prefaced by the word "about" even if the term does not expressly appear, where about in this context means ±5% of the measurement value.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
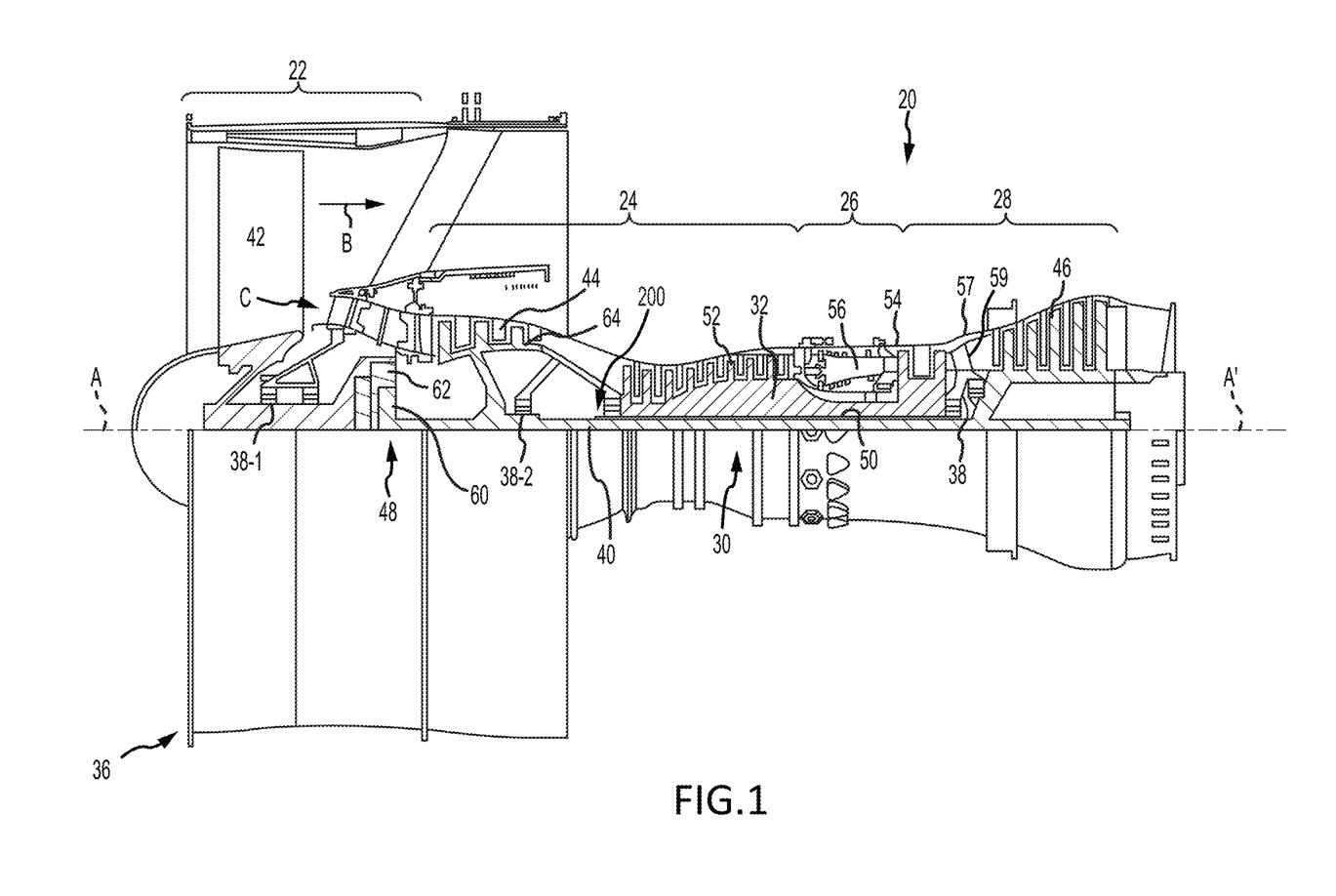
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including turbojet engines, a low-bypass turbofans, a high bypass turbofans, or any other gas turbine known to those skilled in the art.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

In various embodiments, the next generation of turbofan engines may be designed for higher efficiency which is associated with higher pressure ratios and higher temperatures in the HPC 52. These higher operating temperatures and pressure ratios may create operating environments that may cause thermal loads that are higher than the thermal loads encountered in conventional turbofan engines, which may shorten the operational life of current components.

In various embodiments, HPC 52 may comprise alternating rows of rotating rotors and stationary stators. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., along an outer diameter).

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by rotor 64.

Figure 2A:
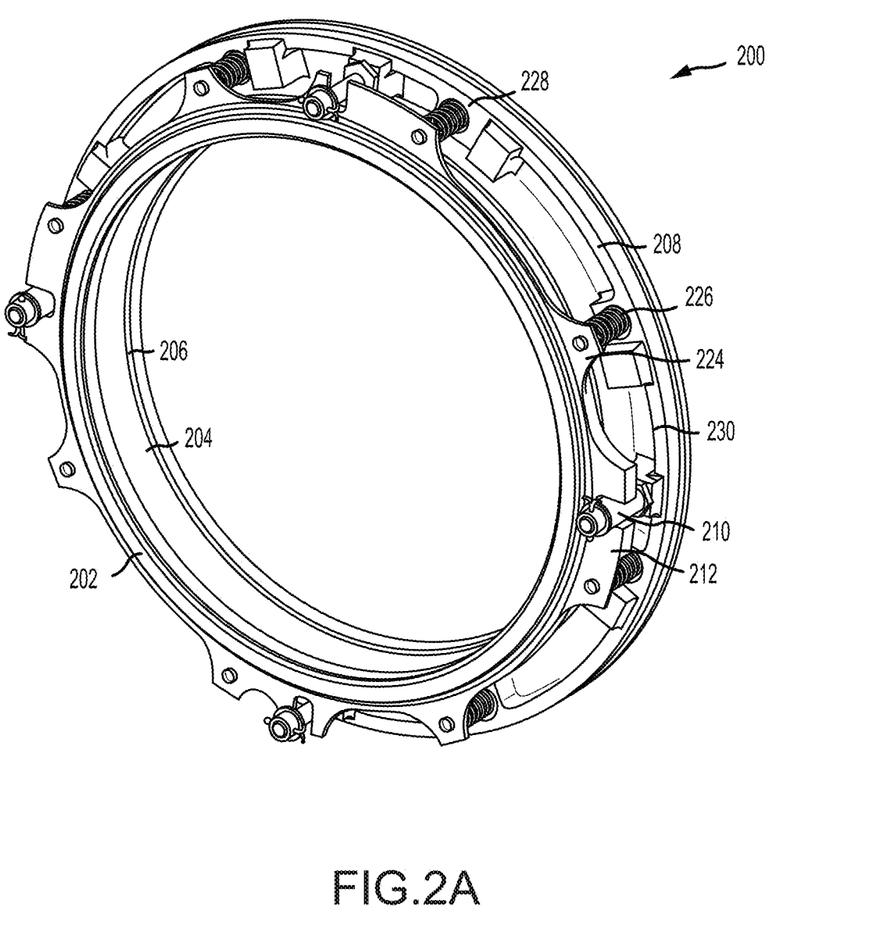
FIG. 2A illustrates an improved carbon face seal assembly, in accordance with various embodiments.
Figure 2B:
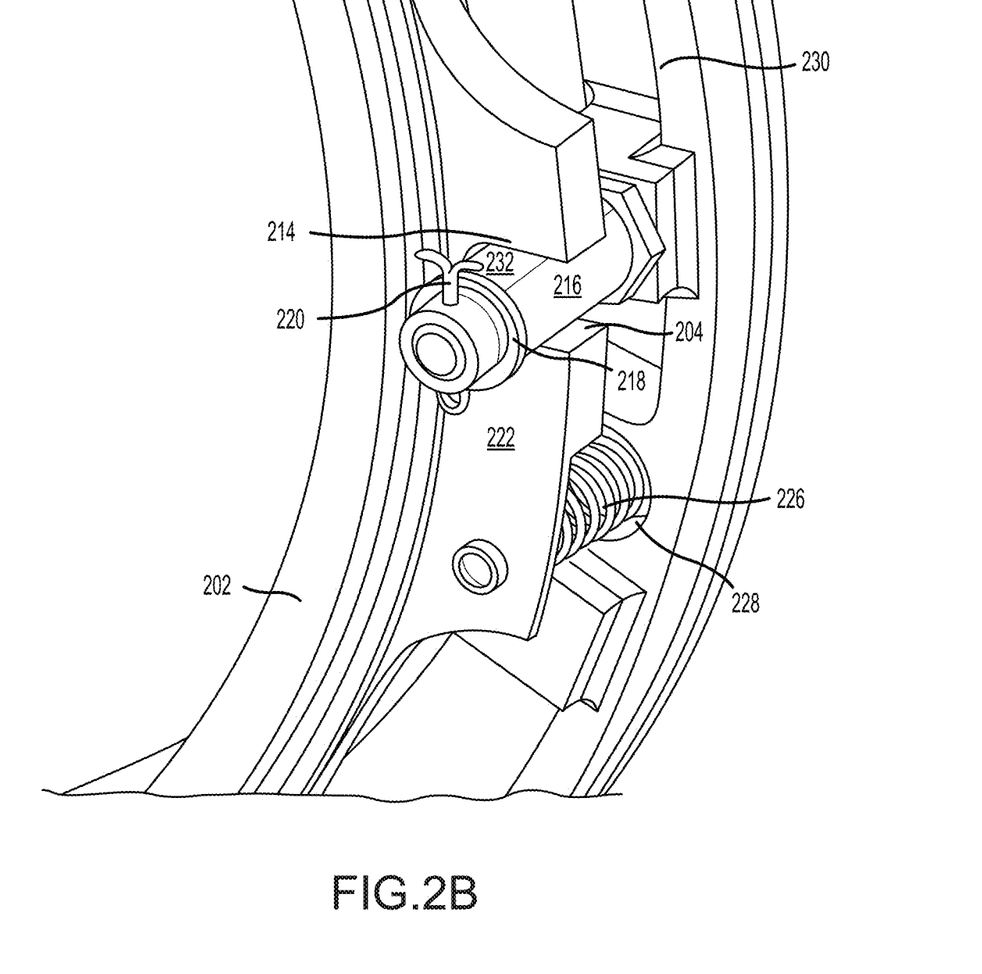
FIG. 2B illustrates an improved carbon face seal assembly, in accordance with various embodiments.

According to various embodiments and with additional reference to FIGS. 2A and 2B, a gas turbine engine such as gas turbine engine 20 may comprise an improved carbon face seal assembly 200. Improved carbon face seal assembly 200 comprises a primary seal 202 which may be press fit into seal housing 204. Seal housing 204 has an annular extrusion 206 disposed within seal support 208. In various embodiments, seal support 208 may comprise alignment pins 210 extending axially outward from forward face 230 of seal support 208 and spring pockets 228 cut axially inward of forward face 230. In various embodiments, seal housing 204 may comprise spring tabs 224 coupled to coil springs 226 and alignment tabs 212 having alignment channels 214. In various embodiments, sleeves 216 may be disposed over alignment pins 210 and comprise a flat portion 232 configured to interface with a corresponding flat portion of inner surface 234 of alignment channels 214.

In various embodiments, seal housing 204 is aligned circumferentially with seal support 208 when alignment pins 210 are disposed within alignment channels 241 and flat portion 232 is in contact with inner surface 234. In response, annular extrusion 206 may be slid axially inward toward forward face 230 and coil springs 226 may be disposed within spring pockets 228 tending thereby to compress coil springs 226. In various embodiments, flange 218 is fitted against sleeve 216 over a distal end of alignment pin 210. In various embodiments, flange 218 is coupled to alignment pin 210 by cotter pin 220 and an interference between flange 218 and forward face 222 of alignment tab 212 tends to inhibit seal housing 204 and annular extrusion 206 from backing out seal support 208.

Figure 3:
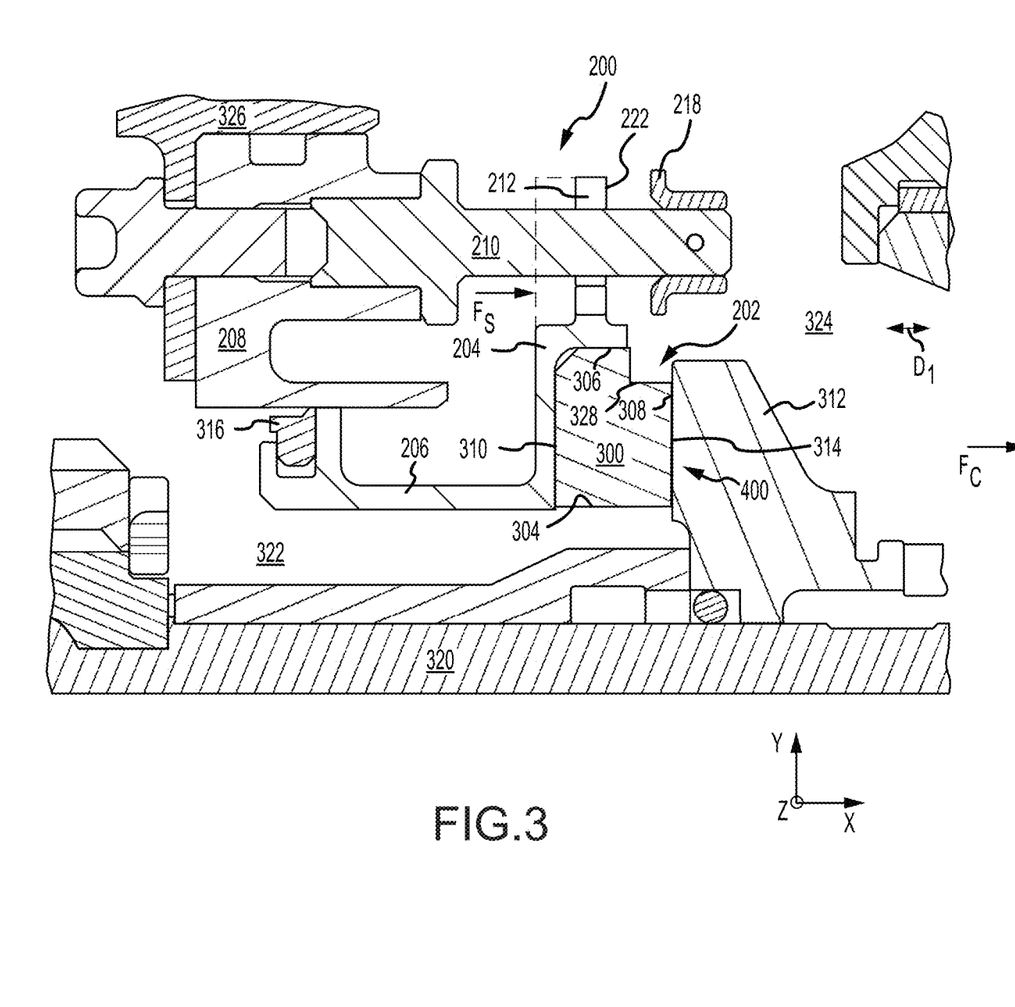
FIG. 3 illustrates a cross section of an improved face seal assembly, in accordance with various embodiments.

In various embodiments and with additional reference to FIG. 3, improved carbon face seal assembly 200 is shown in cross section as installed in a gas turbine engine such as gas turbine engine 20. Improved carbon face seal assembly 200 is coupled to case 326 at seal support 208. A shaft 320 comprising a seal seat 312 is disposed within the annulus of annular extrusion 206 of seal housing 204. In various embodiments, primary seal 202 comprises a seal material 300 having an inner diameter 304, an outer diameter 306, a sealing face 308, and a base 310. In various embodiments a step 328 may be cut inward from outer diameter 306 toward inner diameter 304 and sealing face 308 may be defined between step 328 and the inner diameter 304. In various embodiments, seal housing 204 may comprise a secondary seal 316 at a distal end of annular extrusion 206 opposite primary seal 202. In various embodiments, secondary seal 316 may seal against seal support 208.

In various embodiments, coil springs 226 may impart a spring force $F_s$ upon seal housing 204 driving seal housing axially away from seal support 208 and relatively toward seal seat 312 tending thereby to drive sealing face 308 of primary seal 202 into contact with seating face 314 of seal seat 312. In various embodiments, primary seal 202 may divide a high pressure compartment 322 and a low pressure compartment 324.

In various embodiments and in operation, sealing face 308 of primary seal 202 is contacted with seal seat 312 at seating face 314. During startup, shaft 320 begins axial rotation (X-axis) thereby rotating seal seat 312 and seating face 314 against sealing face 308 of primary seal 202. Primary seal 202 is held fixed by seal housing 204 and seal support 208. As seating face 314 beings to rotate against sealing face 308 a friction force therebetween tends to increase thereby tending to contribute to wearing of primary seal 202 at sealing face 308.

Figure 4A:
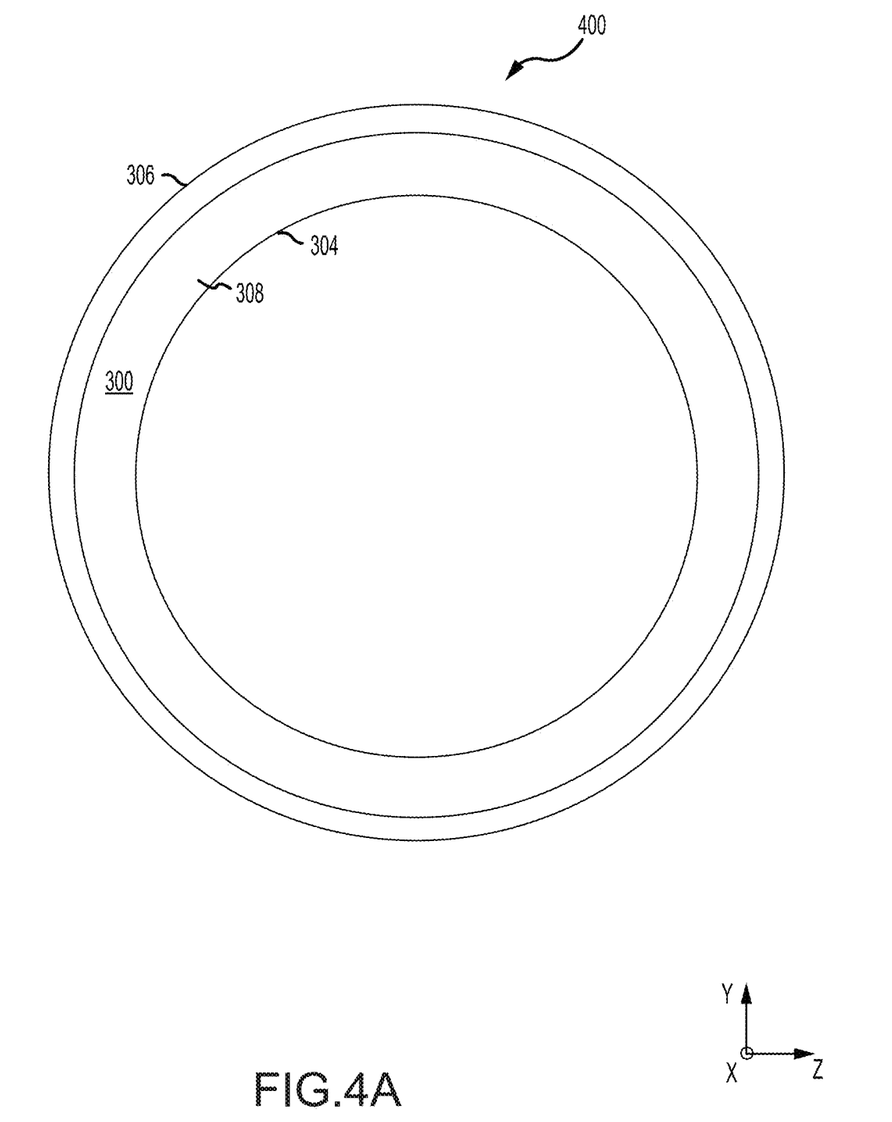
FIG. 4A illustrates a disrupted surface of a seal face, in accordance with various embodiments.
Figure 4B:
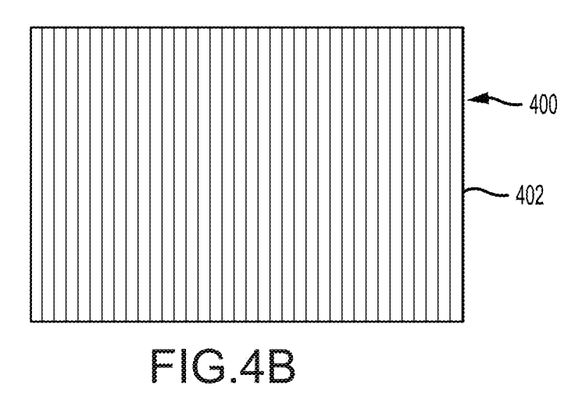
FIG. 4B illustrates a patterned portion a disrupted surface of a seal face, in accordance with various embodiments.
Figure 4C:
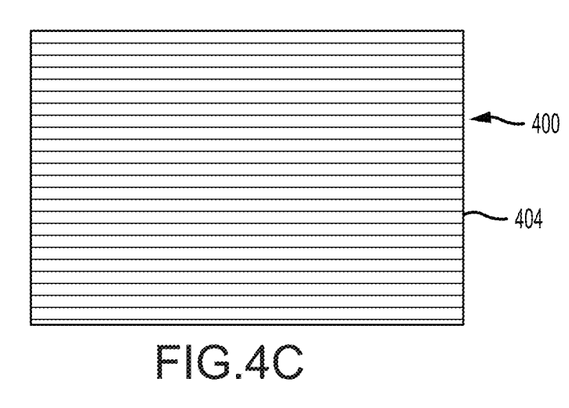
FIG. 4C illustrates a patterned portion a disrupted surface of a seal face, in accordance with various embodiments.
Figure 4D:
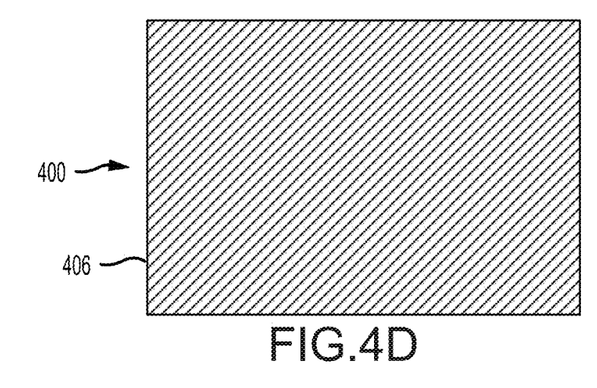
FIG. 4D illustrates a patterned portion a disrupted surface of a seal face, in accordance with various embodiments.
Figure 4E:
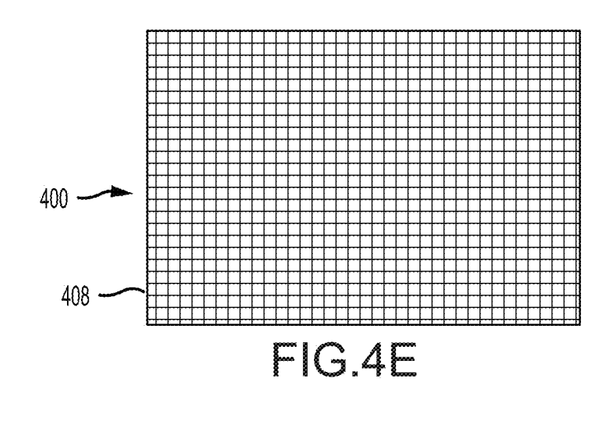
FIG. 4E illustrates a patterned portion a disrupted surface of a seal face, in accordance with various embodiments.

In various embodiments, and with additional reference to FIG. 4A sealing face 308 may comprise a disrupted surface 400. Disrupted surface 400 tends to promote transfer of seal material 300 from sealing face 308 to seating face 314 in response to rotation of the seating face 314 against the sealing face 308. In response to transferring seal material 300 from sealing face 308 to seating face 314 the friction force therebetween tends to decrease. In this regard, disrupted surface 400 tends to improve the wear characteristics of primary seal 202. In various embodiments, disrupted surface 400 may be formed by any suitable method such as, for example, lapping, milling, grinding, media blasting, etching, ablation, and/or the like. With additional reference to FIGS. 4B, 4C, 4D, and 4E, disrupted surface 400 may comprise patterned portions defined by, for example, ablation, etching, abrasions, and/or the like. Disrupted surface may include a radially patterned portion 402, a circumferentially patterned portion 404, a hatch pattern portion 406, and/or a cross-hatch pattern portion 408. Patterned portions (402, 404, 406, 408) may be formed, for example, by regular laser ablation of sealing face 308 leaving ablated portions (illustrated as lines) relatively below the sealing face 308. In this regard, a patterned portion may comprise a plurality of ablated portions. In various embodiments and in contrast to disrupted surface 400, a baseline surface or nominally smooth surface may have an Ra less than 0.254 µm [10 µinch]. In various embodiments, a measured Ra of a nominally smooth surface may be between 0.051 µm [2 µinch] and 0.762 µm [3 µinch]. In various embodiments, the measured Rz of a nominally smooth surface may be between 0.508 µm [20 µinch] to 2.03 µm [80 µinch] or may be between 0.508 µm [20 µinch] and 1.27 µm [50 µinch].

In various embodiments, a laser ablation apparatus may supply laser light and provide a configurable laser light output which may affect the spacing and depth of the ablated portions. In various embodiments, the power output of the laser ablation apparatus may be between 10 watts and 30 watts. In various embodiments, the resolution of the laser ablation apparatus may be between 0.025 µm [1 µinch] and 0.127 µm [5 µinch] and the beam diameter may be 2.03 µm [80 µinch]. In various embodiments the scanning frequency may be configured between 0 kHz and 60 kHz. The spacing between ablated portions may be configured between 0.08 mm [0.0031 in.] 0.25 mm and [0.009 in.]. In various embodiments, the wavelength of the laser light may be between 0.231 μm [9.1 μinch] and 0.277 μm [10.9 μinch]. In various embodiments, the ablation depth may be configured between 0.381 μm [15 μinch] to 12.7 μm [500 μinch], or may be configured between 2.54 μm [100 μinch] to 10.2 μm [400 μinch], or may be configured between 3.81 μm [150 μinch] and 6.35 μm [250 μinch]. In various embodiments, the beam dwell time of the laser light may be configurable. In various embodiments, the laser light output may be configured in accordance with TABLE 1 below. TABLE 1 column one provides a range of laser ablation apparatus power selections as a percentage of a 25 W output power. Column two provides a selection of scanning speeds of the laser light in mm/sec. Column three provides a selection of frequencies in KHz for a laser pulse firing frequency which may be selectable between 0 KHz and 400 KHz. Column four provides a scan diameter in mm below the laser beam focal point. Column five provides a selected spacing of the ablated portions. Column six shows the associated average surface roughness Ra in pinch for the laser ablation apparatus settings of columns 1-5. The Ra describes a mean line across the plurality of ablated portions such that the areas above and below the mean line are within a desired tolerance. Column six shows the associated average peak-to-valley surface roughness Rz in pinch for the laser ablation apparatus settings of columns 1-5. The Rz describes an average of the five greatest peak-to-valley distances of the ablated portions.

TABLE 1

Laser Ablation Apparatus Settings

| INPUTS | | | | | OUTPUTS | |
|---|---|---|---|---|---|---|
| | Scanning | | Scan Diameter | | | |
| Power [% max] | Speed [mm/sec] | Frequency [KHz] | [mm below focal point] | Spacing [mm] | Ra [μinch] | Rz [μinch] |
| 40 | 200 | 20 | −2 | 0.14 | 50.347 | 236.680 |
| 40 | 200 | 20 | −2 | 0.08 | 39.673 | 255.910 |
| 20 | 200 | 20 | −2 | 0.08 | 34.079 | 194.160 |
| 20 | 200 | 60 | −2 | 0.08 | 25.091 | 139.080 |
| 20 | 1000 | 20 | −2 | 0.08 | 19.144 | 114.910 |
| 20 | 1000 | 60 | −2 | 0.08 | 18.540 | 94.510 |
| 40 | 100 | 20 | −2 | 0.08 | 100.843 | 412.830 |
| 40 | 200 | 20 | −2 | 0.25 | 52.498 | 220.270 |
| 40 | 200 | 20 | −6 | 0.08 | 20.340 | 120.740 |
| 40 | 1000 | 20 | −2 | 0.08 | 15.664 | 98.300 |
| 60 | 200 | 20 | −6 | 0.14 | 20.101 | 148.880 |
| 60 | 200 | 20 | −6 | 0.08 | 22.939 | 124.640 |
| 80 | 100 | 0 | −2 | 0.08 | 21.884 | 127.520 |
| 80 | 200 | 20 | −6 | 0.08 | 25.830 | 207.110 |

Figure 5A:
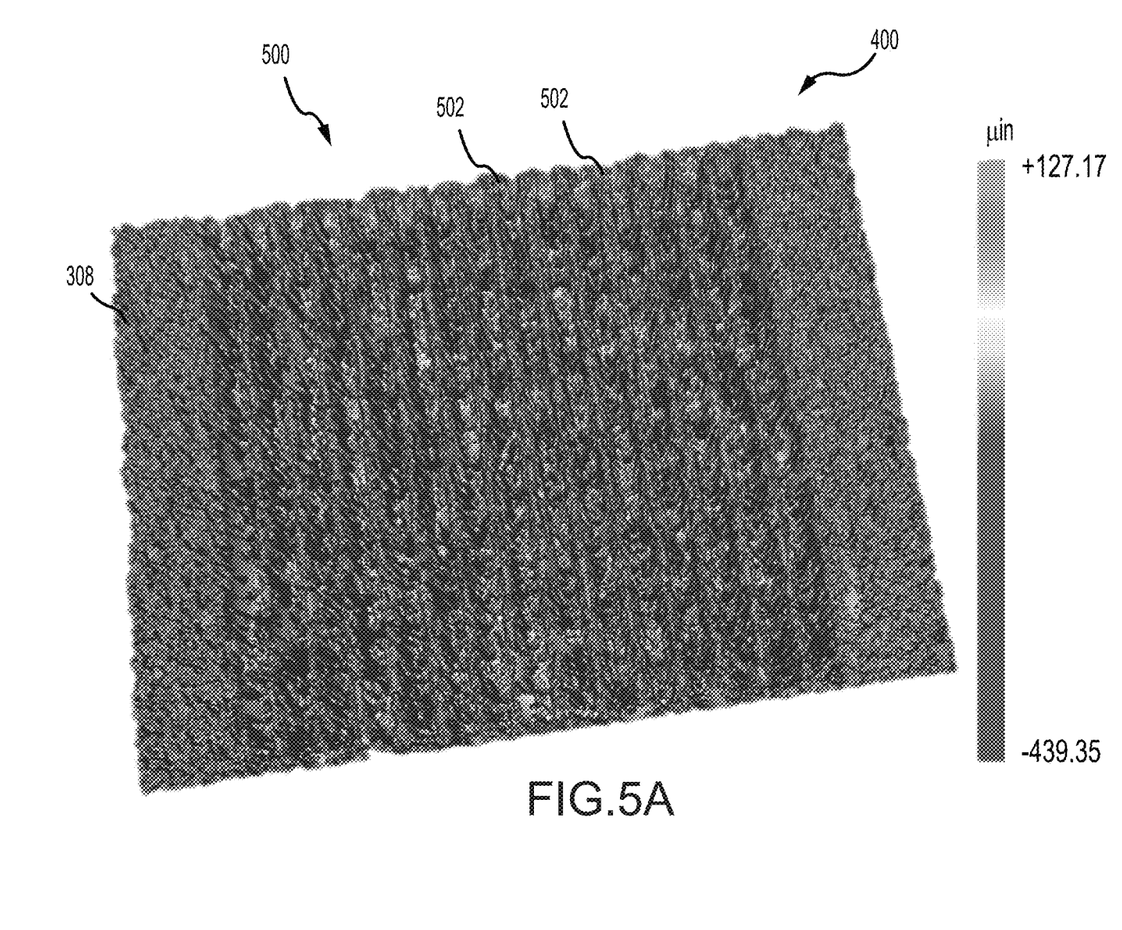
FIG. 5A illustrates a white light interferometry of a patterned portion, in accordance with various embodiments.
Figure 5B:
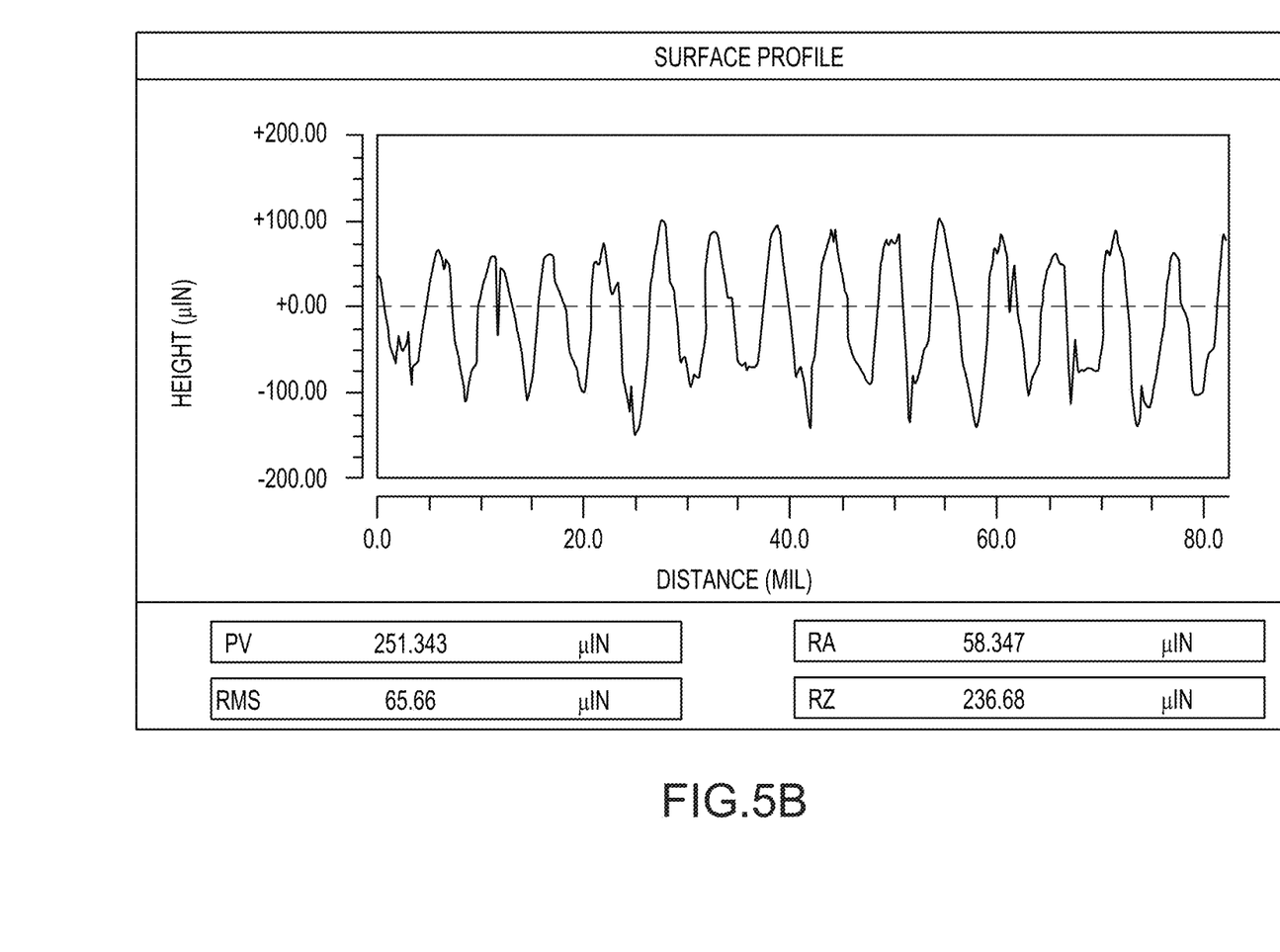
FIG. 5B illustrates a white light interferometry surface profile of a patterned portion, in accordance with various embodiments.

With reference now to FIGS. 5A and 5B, an exemplary patterned portion 500 of disrupted surface 400 are shown under white light interferometry. FIG. 5A illustrates the relative depth (in μin below the sealing face 308) of ablated portions 502 corresponding to the 40% power setting and 200 mm/sec scanning speed of TABLE 1. FIG. 5B illustrates a graph of the surface profile along the disrupted surface between the ablated portions 502 with the X-axis showing the height (in μin) of the ablated portions relative to the Ra line (dashed line marked at 0.00) and the Y-axis showing the relative distance (in μin) between ablated portions from the origin.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An improved face seal, comprising:
   a seal housing comprising an annular extrusion; and
   a primary seal coupled to the seal housing,
   wherein the primary seal comprises a sealing face and a base opposite the sealing face,
   wherein the primary seal has an annular structure coaxial with the annular extrusion with the base proximate a first end of the seal housing,
   wherein the sealing face comprises a disrupted surface extending over the sealing face,
   wherein the disrupted surface comprises a patterned portion,
   wherein the patterned portion comprises a plurality of ablated portions having a depth below the sealing face between 0.381 µm to 12.7 µm,
   wherein the patterned portion includes the plurality of ablated portions having a spacing between each of a relatively adjacent ablated portion of the plurality of ablated portions between 0.08 mm and 0.25 mm, and
   wherein the disrupted surface is configured to promote the transfer of a seal material from the sealing face to a seating face in response to rotation of the seating face against the sealing face.

2. The improved face seal of claim 1, further comprising a seal support, wherein the annular extrusion is disposed within the seal support, wherein the annular extrusion comprises a secondary seal at a distal end of the annular extrusion opposite the primary seal.

3. The improved face seal of claim 1, wherein the patterned portion comprises the plurality of ablated portions having an Ra between 0.381 µm to 2.667 µm.

4. The improved face seal of claim 1, wherein the patterned portion comprises the plurality of ablated portions having an Rz between 2.413 µm to 11.43 µm.

5. A gas turbine engine comprising:
   a compressor section configured to compress a gas;
   a combustor section aft of the compressor section configured to combust the gas;
   a turbine section aft of the combustor section configured to extract work from the gas; and
   an improved face seal, comprising:
   a seal housing comprising an annular extrusion; and
   a primary seal coupled to the seal housing,
   wherein the primary seal comprises a sealing face and a base opposite the sealing face,
   wherein the primary seal has an annular structure coaxial with the annular extrusion having the base proximate a first end of the seal housing,
   wherein the sealing face comprises a disrupted surface extending over the sealing face,
   wherein the disrupted surface comprises a patterned portion,
   wherein the patterned portion comprises a plurality of ablated portions having a depth below the sealing face between 0.381 µm to 12.7 µm,
   wherein the patterned portion includes the plurality of ablated portions having a spacing between each of a relatively adjacent ablated portion of the plurality of ablated portions between 0.08 mm and 0.25 mm, and
   wherein the disrupted surface is configured to promote the transfer of a seal material from the sealing face to a seating face in response to rotation of the seating face against the sealing face.

6. The gas turbine engine of claim 5, further comprising a seal support, wherein the annular extrusion is disposed within the seal support, wherein the annular extrusion comprises a secondary seal at a distal end of the annular extrusion opposite the primary seal.

7. The gas turbine engine of claim 5, wherein the patterned portion comprises the plurality of ablated portions having an Ra between 0.381 µm to 2.667 µm.

8. The gas turbine engine of claim 5, wherein the patterned portion comprises the plurality of ablated portions having an Rz between 2.413 µm to 11.43 µm.

9. An article of manufacture including a carbon face seal having a disrupted surface thereon, the disrupted surface comprising:
   a patterned portion defined by a plurality of ablated portions on a sealing face of the carbon face seal,
   wherein the plurality of ablated portions have a depth below the sealing face between 0.381 µm to 12.7 µm,
   wherein the plurality of ablated portions have a spacing between each of a relatively adjacent ablated portion of the plurality of ablated portions between 0.08 mm and 0.25 mm,
   wherein the plurality of ablated portions have an Ra between 0.381 µm to 2.667 µm,
   wherein the disrupted surface extends over the sealing face of the carbon face seal, and
   wherein the disrupted surface is configured to promote the transfer of a seal material from the sealing face to a seating face in response to rotation of the seating face against the sealing face.

10. The article of manufacture of claim 9, wherein the plurality of ablated portions have an Rz between 2.413 µm to 11.43 µm.

* * * * *